June 9, 1931.  H. T. REEVE  1,809,067
METHOD OF MAKING CATHODES
Original Filed Oct. 7, 1924
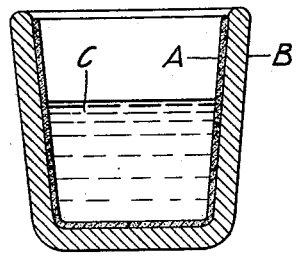
INVENTOR
HOWARD T. REEVE
BY Irving Mac Donald
ATTORNEY Patented June 9, 1931

1,809,067

UNITED STATES PATENT OFFICE

HOWARD T. REEVE, OF MILLBURN, NEW JERSEY, ASSIGNOR TO WESTERN ELECTRIC COMPANY, INCORPORATED, OF NEW YORK, N. Y., A CORPORATION OF NEW YORK

METHOD OF MAKING CATHODES

Original application filed October 7, 1924, Serial No. 742,111. Divided and this application filed June 9, 1928. Serial No. 284,197.

This invention relates to a method of making cathodes and its object is to provide a quick, easy and inexpensive method of making the same.

The invention consists in providing a vessel of inert material having a high melting point with an inner lining of thermionically active material, placing cathode material in the vessel, subjecting the vessel and contents to heat sufficient to cause the reactive lining to combine with the melt to produce a thermionically active compound and forming said compound into cathodes.

The crucible employed in this process consists of a lining A composed of thermionically active material, such as the oxides of barium, strontium and calcium. This lining may be relatively thin but still of sufficient thickness to prevent molten metal reaching the outer refractory. Since the thin lining will be partly taken up in the melting process, it is necessary to have an outer receptacle B of some substance having greater strength and which is inert to the highly reactive lining. Chromium oxide is a very suitable material for this purpose, since it is highly refractory, is practically inert to the reactive lining, can easily be formed into any desirable shape, has a high heating capacity due to its color being green, and its mechanical strength is quite satisfactory for the desired purposes.

The method of making such a crucible is described and claimed in my Patent No. 1,648,149, issued November 8, 1927, entitled "Method of forming refractory crucibles" and consists of forming a filter paper core on any desirable form, such as a glass rod or tube, applying a desirable number of coats of the thermionically active material, by applying the material in paste form on the paper core, drying each coat in a Bunsen flame or other heating means, and brushing a desirable number of coats of chromium oxide paste over the reactive coatings to form a relatively thick outer wall. The form or vessel may then be removed and the crucible fired in an electric furnace, to completely vitrify the laminated walls and reduce the filter paper core to a minute ash which can be removed after the firing operation.

In carrying out my invention, the cathode material C which may be platinum-nickel alloy is deposited in the vessel and placed within an induction furnace or other high heating means. The reactive lining A readily combines with the cathode material being melted and thereby produces a thermionically active compound, which, when removed from the furnace may be drawn into filamentary form to be used as cathodes in electron discharge devices.

This application is a division of my application Serial No. 742,111, filed October 7, 1924, for refractory crucibles.

What is claimed is:

1. Method of making cathodes which comprises providing a vitrified vessel of vitrified inert material of high melting point with an inner lining of thermionically active material, placing cathode material in the vessel, subjecting the vessel and contents to heat sufficient to cause the reactive lining to combine with the melt to produce a thermionically active compound, and forming said compound into cathodes.

2. Method of making cathodes which comprises providing a vessel of chromium oxide with a lining of active oxides of the alkaline earth group, placing platinum-nickel alloy in said vessel, subjecting said vessel and contents to heat sufficient to cause the lining to combine with the melt to produce a thermionically active compound, and drawing the same into filamentary form for use as cathodes.

In witness whereof, I hereunto subscribe my name this 7th day of June, 1928.

HOWARD T. REEVE.